April 4, 1967 D. A. WILBUR ET AL 3,312,859
CROSSED FIELD TRANSVERSE WAVE AMPLIFIER
COMPRISING TRANSMISSION LINE
Filed Sept. 10, 1962 5 Sheets-Sheet 1

Inventors:
Donald A. Wilbur,
Philip N. Hess,
Se Puan Yu,
by Philip L. Schlamp
Their Attorney.

Inventors:
Donald A. Wilbur,
Philip N. Hess,
Se Puan Yu,
by Philip J. Schlamp
Their Attorney.

Inventors:
Donald A. Wilbur,
Philip N. Hess,
Se Puan Yu,
by Philip Z. Schlamp
Their Attorney.

Inventors:
Donald A. Wilbur,
Philip N. Hess,
Se Puan Yu,
by Philip Z. Schlang
Their Attorney.

Inventors:
Donald A. Wilbur,
Philip N. Hess,
Se Puan Yu
by Philip R. Schlamp
Their Attorney.

United States Patent Office 3,312,859

Patented Apr. 4, 1967

3,312,859
CROSSED FIELD TRANSVERSE WAVE AMPLIFIER COMPRISING TRANSMISSION LINE

Donald A. Wilbur, Scotia, and Se Puan Yu, Schenectady, N.Y., and Philip N. Hess, Los Altos, Calif., assignors to General Electric Company, a corporation of New York Filed Sept. 10, 1962, Ser. No. 222,484
22 Claims. (Cl. 315—39)

This invention relates to transverse wave amplifiers and pertains more particularly to new and improved fast-wave crossed-field electric discharge devices adapted for high power R.F. amplification at microwave frequencies.

Disclosed and claimed in U.S. Ser. No. 222,510 of D. A. Wilbur and P. N. Hess filed concurrently herewith and assigned to the same assignee as the present invention are new and improved fast-wave, crossed-field electric discharge devices adapted for high-efficiency, high power R.F. amplification at microwave frequencies. The present invention contemplates improvements in the device disclosed by Wilbur et al. in the above-identified application and more particularly contemplates improved fast-wave, crossed-field devices adapted for affording enhanced mode separation, and improved stability and gain in addition to the desirable operating characteristics obtainable with the Wilbur et al. devices. Additionally, the present invention contemplates improved devices of the above-discussed type including means for extracting power in the low-loss $TE_{01}$ circular mode.

Accordingly, a primary object of the present invention is to provide a new and improved transverse wave amplifier adapted for high-power, high-efficiency operation at microwave frequencies and further adapted for enhanced mode separation, and improved stability and gain.

Another object of the present invention is to provide a new and improved transverse wave amplifier including new and improved power output coupling means.

Further objects and advantages of the invention will become apparent as the following description proceeds and the features of novelty which characterize the invention will be pointed out with particularity in the claims annexed to and forming part of this specification.

In carrying out the objects of the present invention, and according to one embodiment, there is provided a transverse wave amplifier comprising a coaxial transmission line defined by spaced inner and outer conductors and having a length preferably of at least three free-space wavelengths at a predetermined operating frequency. One of the conductors comprises an anode including a plurality of radially and longitudinally extending segments defining elongated cavity resonators which can be of alternately different sizes. The other conductor comprises a cathode and these conductors cooperate also to define an elongated annular interaction space. Means are provided for establishing both a coaxial magnetic field and radial electric fields in the interaction space. Also provided at longitudinally spaced sections of the transmission line are electromagnetic wave signal input and output means. Provided between the input and output means is means providing an axial impedance taper. Means are also provided for effecting an axial electron flow and an axial periodicity in the transmission line between the input and output means. Provided beyond the output means is an R.F. choke effective for preventing passage thereby of energy intended to be extracted by the output means and provided beyond the choke is low reflection means for dissipating energy not extracted by the output means. In another embodiment the output means comprises a section of circular waveguide adapted for transmitting energy in the low loss $TE_{01}$ mode and transition to the circular waveguide mode is effected by means providing a graduate transition from the cavity resonator geometry to the circular waveguide geometry. The circular waveguide section includes a dielectric R.F. window hermetically sealed transversely therein.

For a better understanding of the present invention, reference may be had to the accompanying drawing wherein.

Figure 1:
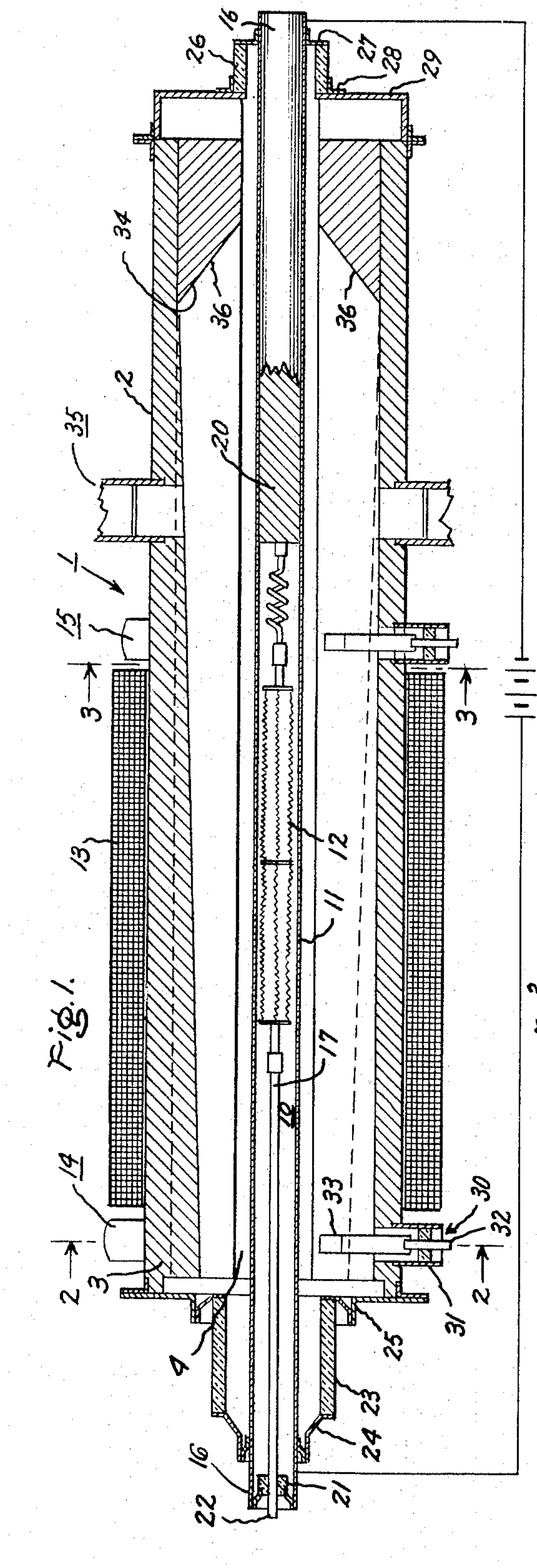
FIGURE 1 is a longitudinal sectional view of a device constructed according to one embodiment of the invention.
Figure 3:
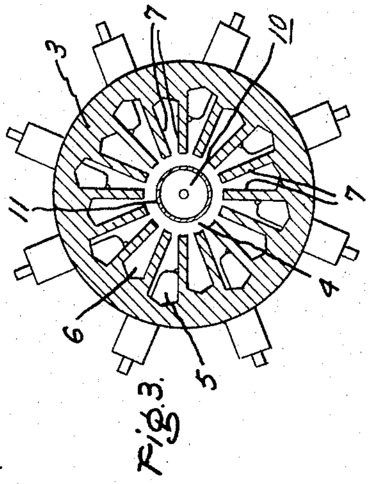
FIGURE 3 is a sectional view taken along the lines 3—3 in FIGURE 1 and looking in the direction of the arrows.
Figure 2:
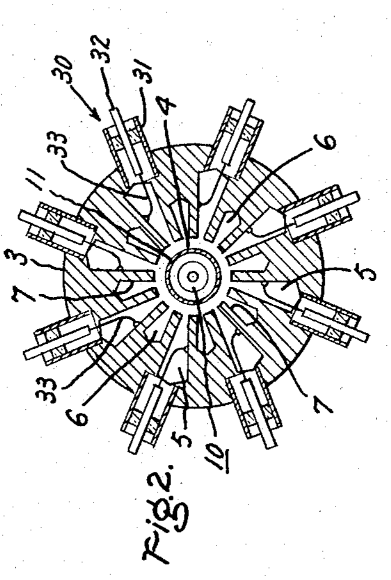
FIGURE 2 is a sectional view taken along the line 2—2 in FIGURE 1 and looking in the direction of the arrows.

Referring now to the drawing, there is shown in FIGURES 1–3 a fast-wave, crossed-field device constructed according to one embodiment of the present invention and generally designated 1. The device 1 includes an elongated cylindrical conductive envelope 2 which can comprise a generally cylindrical anode block 3 formed to define a central space 4 and a plurality of circumferentially, equally-spaced cavity resonators opening into or communicating with the central space 4.

As seen in FIGURES 2 and 3, the anode 3 has a so-called "rising sun" cross section, or, in other words, includes alternate large and small cavity resonators designated 5 and 6, respectively. Expressed in another manner, the anode structure comprises a plurality of radially extending equally-spaced anode segments 7 and immediately adjacent spaced ones thereof cooperate in defining cavities and each segment separates a pair of differently-sized cavities. The "rising sun" cross section, or alternate differently-sized anode cavities, provide separation in frequency and synchronous voltage between the desired mode and adjacent modes in essentially the same manner as in the operation of a conventional "rising sun" magnetron. However, for the purpose of suppressing undesired oscillatory modes in a manner to be described in detail hereinafter, the smaller resonator cavities 6 are of progressively increasing depth from one end of the device toward the other.

The resonator cavities and anode segments can be provided by forming the cavities in the cylindrical block 3 in the manner illustrated or by constructing the anode structure to include a plurality of circumferentially spaced radially extending vanes mounted on the inner wall of a conductive cylinder.

Coaxially located in the central space 4 of the anode block is a cathode assembly generally designated 10. As shown in FIGURE 1, the cathode assembly 10 can be of the indirectly heated type and includes a cylindrical outer member 11 containing a heating element 12. The outer cathode member 11 and the anode structure 3 cooperate in defining an elongated annular interaction space adapted for having an electric field extending therein between the anode and cathode members. Provided for establishing a magnetic field in transversely extending, or crossed, relation to the electric field is magnetic means which can comprise an elongated solenoid coil 13 surrounding the device envelope and effective for providing a magnetic field coaxial with the envelope.

To this point the device described above resembles a rising sun $\pi$-mode oscillating magnetron. However, in contradistinction, and according to the teachings of Wilbur et al. in the above-mentioned copending application, the cathode member 11 and the anode structure of the present device also cooperate in defining a coaxial transmission line having a length preferably at least three free-space wavelengths at a predetermined operating frequency and adapted for supporting and propagating a longitudinally traveling electromagnetic wave extending transverse to the electric field and parallel to the direction of the extension of the anode segments and magnetic field. Input and output coupling means, generally designated 14 and 15, respectively, and which will be described in detail hereinafter, are provided at longitudinally spaced sections along the transmission line.

In the presently disclosed device the outer cathode member 11 has an electron emissive outer surface which can extend only part of the length of the device in the manner shown in FIGURE 1 or can, if desired, extend the full length of the interaction space.

At opposite ends of the device the outer cathode member 11 includes cylindrical extensions which protrude beyond the ends of the envelope and include exposed surfaces 16 for serving as electrical contacts. Located in the section of the member 11 corresponding to the emissive surface thereon is the heater element 12 which is supported between a coaxial support rod 17 and a conductive plug 20 secured in the member 11 outwardly of the output coupling means 15. The support rod 17 and the member 11 are mutually insulated and hermetically joined by an insulative sleeve-like element 21. An end portion 22 of the rod 17 extends exposed for serving as an electrical contact. The corresponding end of the extension of the cathode member 11 is coaxially sealed to the anode structure by means including an insulative cylinder 23, a flanged sealing ring 24 joined between the outer surface of the extension of the cathode member 11 and one end of the cylinder 23 and a sealing ring arrangement 25 sealed between the opposite end of the cylinder 23 and the corresponding end of the anode block. The end of the cathode member 11 at the end of the device opposite the just-described arrangement is coaxially hermetically sealed in insulated relation in the corresponding end of the device envelope by means of an insulative sleeve 26, a sealing ring 27 joining the end of the cathode member and one end of the sleeve 26 and another sealing ring 28 sealed to an end plate 29 which, in turn, is sealed to the end of the anode block. In the just-described arrangement the cathode member 11 serves jointly as part of the cathode circuit and one side of the heater circuit. Additionally, the exposed contacts 16 on opposite ends of the device enable the provision of a D.C. current in the cathode, thereby to provide, in a manner to be described in detail hereinafter, enhancement of both gain and stability of the device.

As seen in FIGURES 1 and 2, the input coupling means 14 can comprise a plurality of individual coaxial terminals 30 having the outer conductors 31 thereof conductively connected to the device envelope and the inner conductors 32 connected to individual coupling loops 33 extending into and terminating in each of the larger cavities 5. This arrangement is effective for circumferentially, uniformly exciting, or introducing an R.F. signal into, the device and, if desired, all of the terminals 30 can be coupled to a single power transmission line including means for uniformly dividing the power amongst the several input terminals. Alternatively, the input means 14 can comprise a waveguide input of the type disclosed in the above-mentioned copending application of Wilbur et al. and including iris coupling into circumferentially equally spaced resonator cavities. Additionally, the output means 15 can be identical to the input means and according to the teaching of Wilbur et al. in the above-identified copending application the section of the coaxial transmission line between the input and output means is preferably at least three free-space wavelengths at a predetermined operating frequency.

To this point, and except for the rising sun anode cross section having smaller cavities 6 which progressively become deeper from the input and toward the output end of the device and the means whereby a D.C. current may be provided extending axially through the cathode, the device is substantially the same structurally and operationally as the device disclosed and claimed in the mentioned copending Wilbur et al. application. That is, the anode and cathode assemblies of the present device define both an elongated annular interaction space and a coaxial transmission line or two-conductor wave-guiding system. This transmission line may be thought of as a length of coaxial line having a complex cross-sectional geometry. Such a line is characterized by a TEM transmission mode plus intricate sets of TE and TM modes. Each TE wave is characterized by a particular transverse electric field product. Conventional magnetron oscillators operate at or near the cut-off frequency of one of the mentioned TE modes where the power propagates in an angular direction. However, the present device, as does the above-mentioned Wilbur et al. device, operates above the cut-off frequency and while the transverse electric field pattern in the present device is the same as in any conventional magnetron, the power propagates in the present device in the axial direction, or parallel to the anode segments 7. Additionally, the transmission line is particularly adapted for propagating a $$TE_{\frac{N}{2},1}$$

mode in the axial direction and the described input couplers are effective for exciting the device in this mode. Further, the axial length of the transmission line between the input and output sections of the device is at least three, and preferably three to four, free-space wavelengths at a predetermined operating or design frequency. If desired, still greater lengths are employable without detracting from the operativeness of the device.

An examination of the total electric field associated with the mentioned $$TE_{\frac{N}{2},1}$$

mode at any transverse plane of the device would show an electric field distribution identical to that within a $\pi$-mode oscillating magnetron of the same cross section. The periodic change in R.F. voltage between immediately adjacent anode segments which may be described in terms of two identical contra-rotating waves in the case of a conventional magnetron, is caused by the passage of the axial wave. As in the operation of a conventional $\pi$-mode oscillating magnetron, interaction between the transverse plane electric field in the interaction space and an electron cloud circulating in the transverse plane can be accomplished by predetermined selection of the magnitudes of the focusing radial D.C. electric field and D.C. axial magnetic field supplied by the solenoid 13 so as to synchronize the rotation of the electron cloud with the phase velocity of one of the apparent contra-rotating waves producing the $\pi$-mode field distribution. The interaction processes relied upon are essentially similar to those in the conventional oscillating magnetron. That is, electron potential energy from the rotating space charge is abstracted and appears as an increase in amplitude of the TE wave propagating axially down the transmission line formed by the anode and cathode structures. Thus, amplification of the wave, or an electromagnetic wave or signal introduced at the input 14, is effected and appears at the output section for being abstracted for transmission to a useful load.

Additionally, and as indicated above, each individual transverse section of the device acts as a conventional magnetron. Thus, the individual sections act as current generators that induce axially directed waves on the transmission line traveling toward both the input and output. However, the input signal causes the individual sections to be so phased that the output waves reinforce while the waves traveling back toward the input are effectively cancelled as in a multi-hole directional coupler.

The above-referenced increase in depth of the smaller cavities 6 from the input section toward the output section is effective both for maintaining high operating efficiency over the entire length of the anode and for aiding in the suppression of any resultant self-oscillatory modes whereby the device could be caused to oscillate undesirably in the manner of a conventional magnetron rather than to operate in the manner discussed above and according to the Wilbur et al. teaching.

Figure 4:
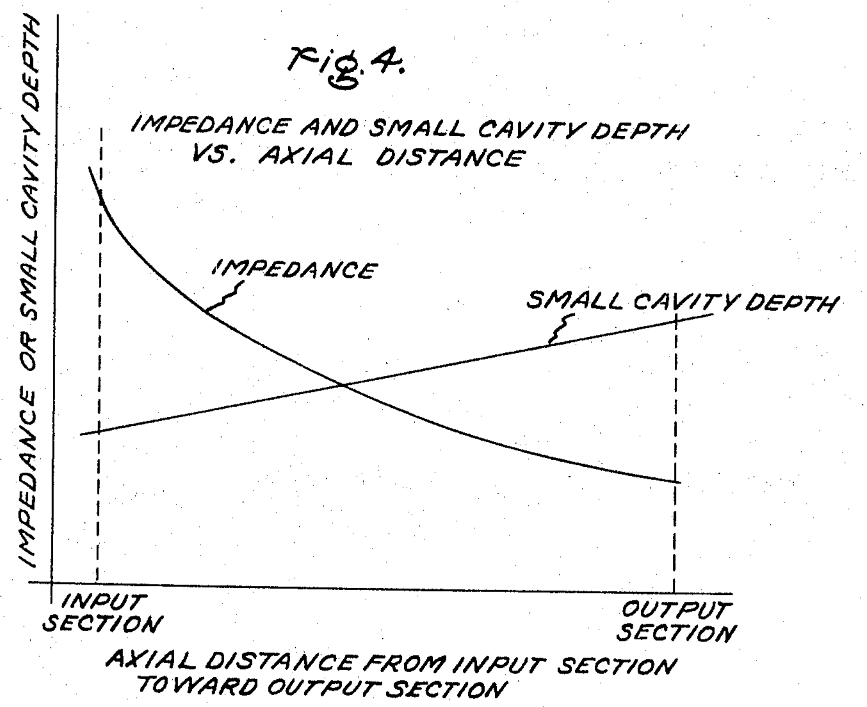
FIGURE 4 is a graphic illustration of the relationship between the impedance and the depth of the smaller cavities along the axial length of the device illustrated in FIGURE 1.

More specifically, it has been found that inasmuch as the signal power increases from the input section toward the output section in the disclosed type of device, high efficiency operation may everywhere be obtained by tapering one or more interaction parameters along the axial length of the device. In particular, by lowering the interaction impedance from the input section axially toward the output section so that the R.F. electric fields have the same magnitude at each cross-section a constant high density of power generation may be maintained along the entire length of the transmission line. Additionally, each succeeding incremental cross-section of the device heavily loads the preceding cross section and can thereby load the self-oscillatory mode impedance below the point of start oscillation. The provision of the just-described impedance taper is readily accomplished with a device having a rising-sun type of cross section by increasing the depths of the smaller cavities in the direction of propagation, or, in other words, from the input section toward the output section in the manner illustrated in FIGURES 1 to 3 and discussed above. Such depth increase of the smaller cavities desirable progressively lowers the cut-on frequency of the operating mode and, therefore, for a given operating frequency, lowers the waveguide impedance. A typical variation in impedance with axial length of the transmission line defined by the coaxial anode and cathode is shown graphically in FIGURE 4.

The above-described impedance taper is also effective in providing a device capable of greater total gain at a constant high level of electronic efficiency. Specifically, in the operation of the described device and inasmuch as the R.F. interaction field varies as the square root of the product of the R.F. power and impedance, the R.F. interaction field tends to remain constant from the input section to the output section, or, in other words, as power is added by the electron stream, the impedance decreases due to the taper. In this manner, the entire device can be operated at a constant optimum level. Saturation effects can be postponed and much larger total gain can be realized. In essence, the amplification process in the described device involves adding energy to the R.F. magnetic field rather than to the R.F. electric field, which process results in a device capable of greater total gain at a constant high level of electronic efficiency.

Figure 5:
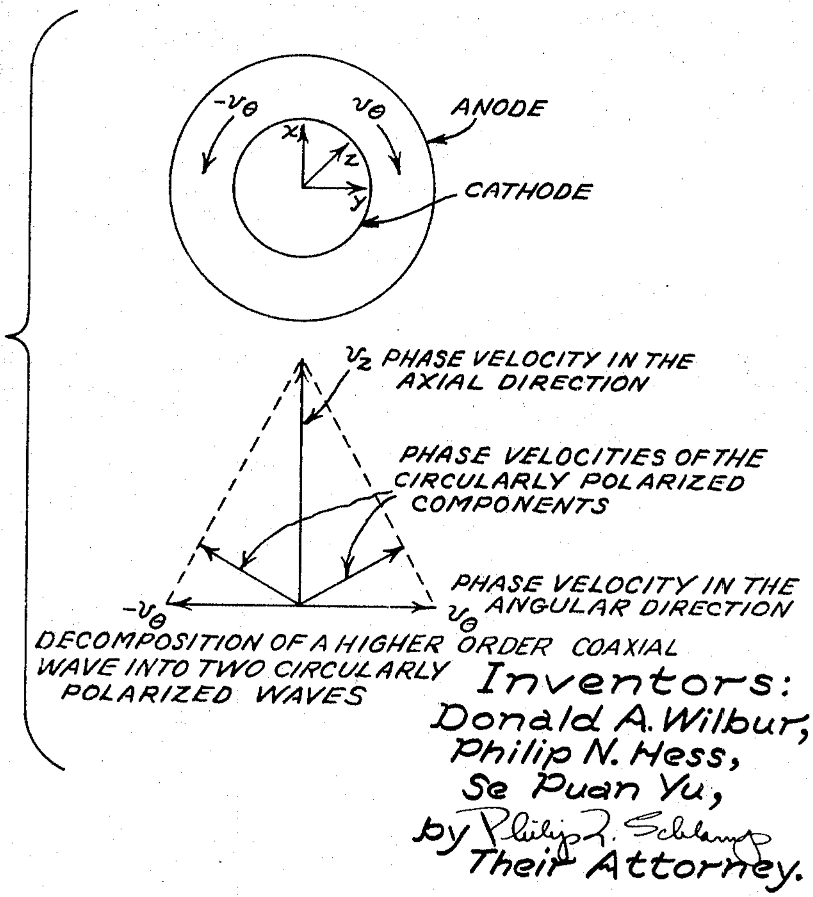
FIGURE 5 is a graphic illustration of the effect of the feature of applicants' invention whereby axial electron flow is provided.

In the disclosed type of device satisfactory operation is obtainable with electron motion at right angles to the direction of wave energy propagation. However, it has been found that enhancement of both gain and operating stability can be obtained by providing a component of electron velocity in the direction of energy propagation, thus to provide an axial electron drift in the interaction space. The magnitude of this axial velocity component is determined by the condition that the total electron velocity be normal to the wave front of one of the circularly polarized components which add to provide the total propagating R.F. fields. This situation is illustrated in FIGURE 5.

In the device of FIGURE 1, the mentioned desired electron drift in the axial direction is obtainable by passing a relatively large D.C. current down the cathode in the axial direction. This is provided for by the construction which enables D.C. electrical connections to be made to both contacts 16 located at opposite ends of the device envelope. The mentioned D.C. axial current produces an angularly directed magnetic field which, with the radial electric field between the anode and cathode, produces an axial component of electron velocity which, in turn, produces an axial electron motion.

The above-described impedance taper effectively inhibits self-oscillation of the device in the manner of a conventional magnetron. The device also includes means effective for inhibiting any tendency for the device to oscillate as a result of axial reflections of other propagating modes which can result from imperfect input and output terminations for these modes. This latter type of oscillation may be considered analogous to those which result in traveling wave tube instabilities. Specifically, it has been found that to inhibit such longitudinal oscillations it is necessary to provide low-reflection terminations for all possible modes at the output end of the tube. Coupled with this is the need for an output coupler to abstract to a useful load the energy in the desired mode of operation. Thus, and by way of solution to the problem mentioned, the present invention involves the provision of a frequency-sensitive quarter-wave R.F. choke 35 located behind the output coupling means 15 and which is adapted for preventing passage therepast of the desired mode, but is invisible to, or has no effect on, the undesired modes. In this manner, desired mode energy is coupled out of the device while all other energy continue to propagate down the structure and is eventually absorbed in low-reflection terminating elements 34 located in the end of each of the cavities. The elements 34 can comprise high electrical resistivity elements having tapered surfaces 36 confronting the energy propagating down the device.

Figure 6:
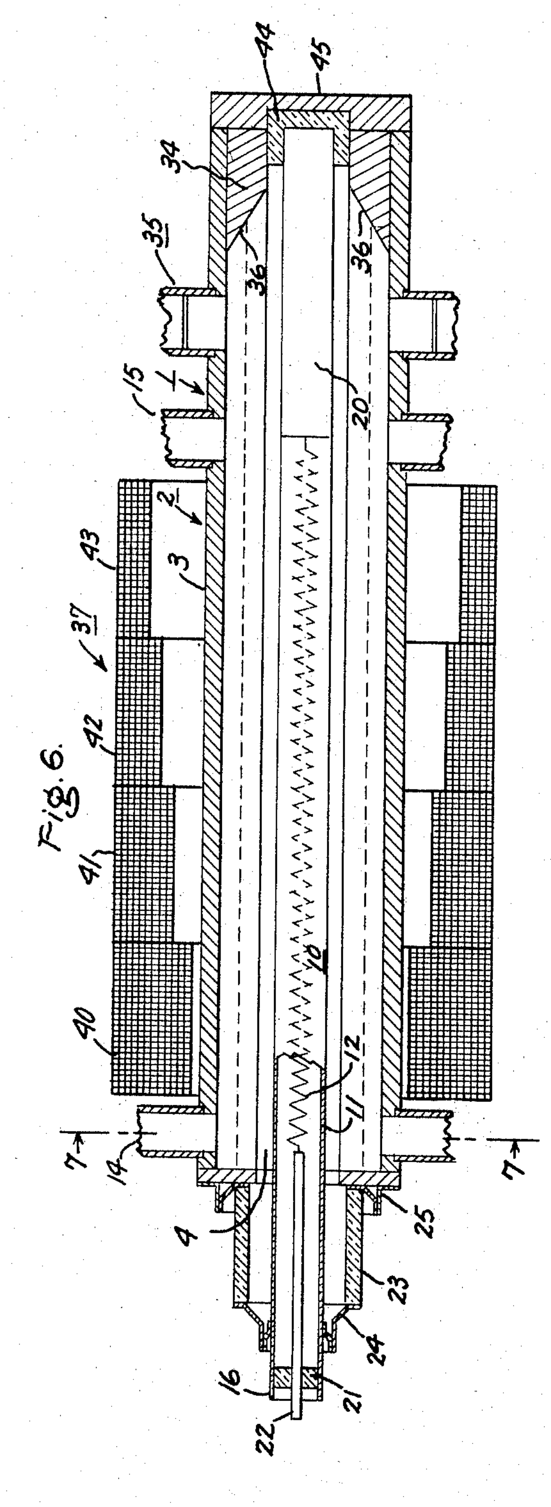
FIGURE 6 is a longitudinal sectional view of a modified form of the invention.

Disclosed in FIGURE 6 is a modified form of device constructed according to the present invention and includes modified means for providing the desired axial electron drift. Specifically, the device of FIGURE 6 includes a solenoid 37 effective for providing a tapered magnetic field extending coaxially through the device. The solenoid 37 can comprise a plurality of coaxial individual solenoid coils 40–43 of progressively greater internal diameters from the input section toward the output section of the device. This arrangement provides for a more concentrated magnetic field near the input section and a progressively divergent and less concentrated field along the path of wave energy propagating toward the output section. Thusly are provided angularly directed magnetic field components which, with the electric field in the interaction space, produce the desired component of electron velocity in the direction of wave energy travel, which results in axial electron motion or drift. This drift, as discussed above, has the desirable effect of enhancing both gain and stability. In addition, the tapered value of axial field will tend to maintain the operating efficiency of the interaction constant along the length of the structure. It is to be understood from the foregoing that the tapered or divergent magnetic field can be provided in any desired manner and is not limited to the use of the particular magnet construction disclosed. For example, the solenoid coil 37 can be subdivided into a plurality of sections 40–43 of equal dimensions but operated at progressively lower current values to provide the progressively weaker field from the input end toward the output end.

Figure 7:
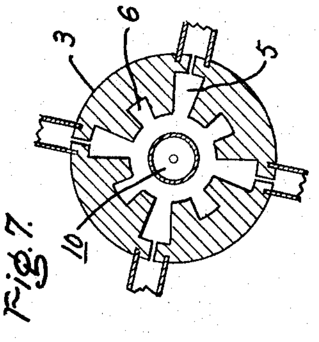
FIGURE 7 is a sectional view taken along the lines 7—7 in FIGURE 6 and looking in the directions of the arrows.

Aside from the just-described structure for tapering the magnetic field, the device of FIGURE 6 can be substantially the same structurally and functionally as that of FIGURE 1 and the same numerals are used to show identical or generally similar elements. Of course, in this device the cathode member 11 need not be adapted for having a D.C. current directed therethrough and therefore the member 11 need not be provided with exposed contact surfaces on both ends of the device as in the device in FIGURE 1. Therefore, in the device of FIGURE 6 the one end of the cathode member 11 can be suitably supported coaxially in an insulative cup 44 fixed centrally in a conductive end plate 45. Additionally, in the device of FIGURE 6 the input and output coupling means generally designated 14 and 15, respectively, comprise waveguide coupling means instead of individual loop coupling means. As better seen in FIGURE 7, each of the coupling means can comprise a plurality of circumferentially equally spaced waveguide sections iris-coupled to each of the larger resonator cavities 45. Suitable means (not shown) can be provided for equally dividing power to the individual waveguide coupling sections. At the output section 15 the waveguides can be all coupled to a single waveguide for adding and directing the power to a useful load. It is to be understood that, if desired, the coupling means can be of the type illustrated in FIGURES 1 and 2. Also, if desired, the coupling means can each comprise a waveguide section wrapped about the device envelope and coupled to each or circumferentially equally spaced ones of the cavities in the device according to the teaching in the above-mentioned Wilbur et al. application. Further, it is to be understood that in the device of FIGURE 6 the smaller resonator cavities 6 are of progressively greater depth from the input section toward the output section of the device and the reflection terminating elements 34 and the R.F. choke 35 serve in the same manner as the comparable members provided in the device of FIGURE 1.

Figure 8:
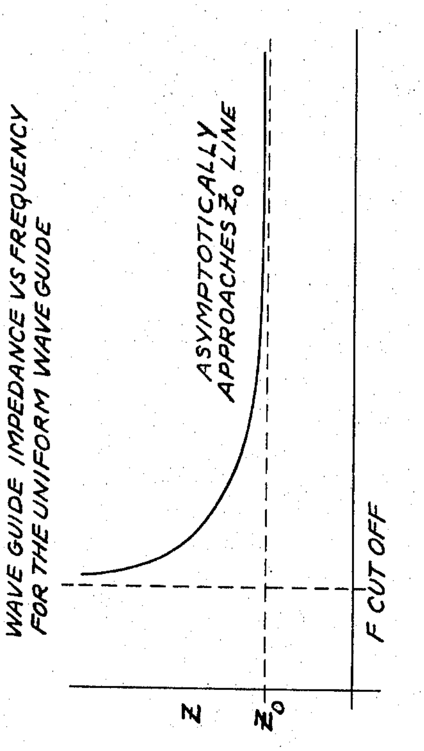
FIGURE 8 is a graphic illustration of the relationship between waveguide impedance and frequency for a uniform waveguide.

The gain per unit length of the above-described devices is a function of the impedance of the waveguides defined by the anodes and cathodes. The waveguides are coaxial waveguides and have an impedance versus frequency characteristic as shown in FIGURE 8. As the frequency increases above cut-on, the impedance asympototically approaches a low value which typically amounts to tens of ohms. This impedance can be raised by making the waveguiding structures periodic in the axial directions whereby the structures are adapted for constituting slow wave structures in both the angular direction and in the axial direction.

Figure 9:
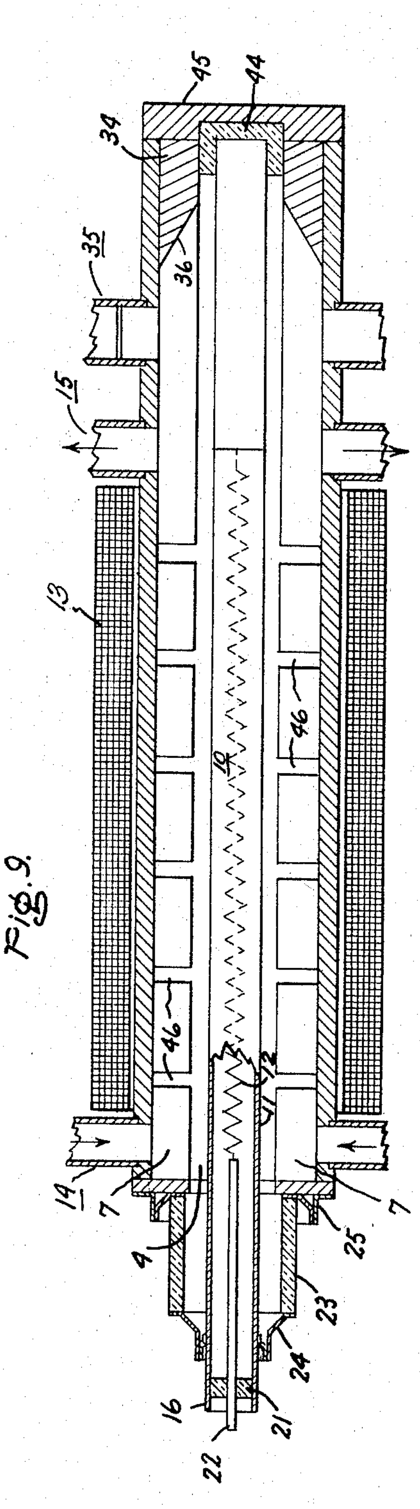
FIGURE 9 is a longitudinal sectional view of another modified form of the present invention.
Figure 10:
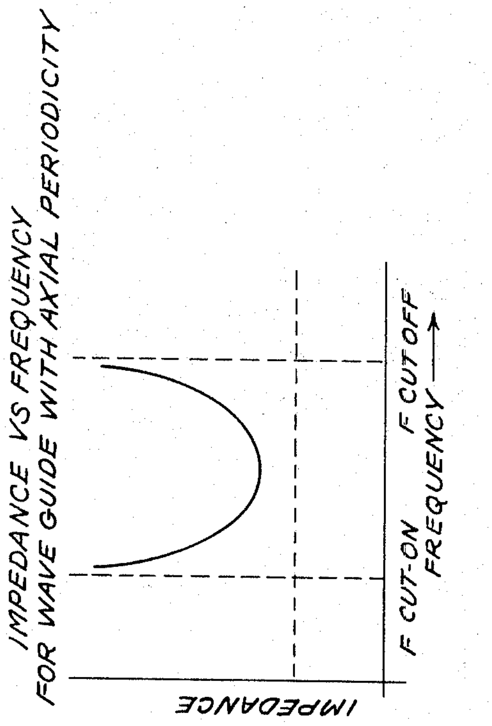
FIGURE 10 is a graphic illustration of the effect of the structure of FIGURE 9 on the relationship between impedance and frequency for a waveguide of the type defined by the structure of FIGURE 9.

Illustrated in FIGURE 9 is a device adapted for providing the above-discussed axial periodicity. This device can be essentially identical to the previously described embodiments of the present invention and the same numerals are used to identify identical or generally similar elements. The device of FIGURE 9 differs, however, in that the anode segments 7 are each provided with equally-spaced discontinuities or slots 46 whereby such segments are uniformly segmented or subdivided. This construction provides the above-discussed axial periodicity whereby the anode structure is adapted for serving as a slow wave structure in the axial direction as well as the angular direction. While equally spaced slots are shown equally spaced irises may be used in the backs of the cavities and the anode segment faces maintained uniform. A typical impedance versus frequency characteristic for axial propagation and axial periodicity is shown in FIGURE 10.

By maintaining the impedance at a high level the modification of FIGURE 9 is effective for increasing the gain per unit length of the device. While in FIGURE 9 each anode vane is segmented all anode vanes need not be segmented. For example, every other one or equally spaced ones can be segmented.

In addition to providing desired separation in frequency and synchronous voltage between the desired operating mode and adjacent modes and in addition to providing a particularly convenient geometry for providing the axial impedance taper, the rising-sun cross sectional configuration of the present device is adapted for coupling power out in the low-loss $TE_{01}$ circular mode. More specifically, the operating mode within a rising-sun structure is composed of a linear combination of the $$TE_{\frac{N}{2},1}$$

and the $TE_{01}$ modes. In the rising sun magnetron this effect is known as the "zero-mode contamination" and results from the peculiar boundary conditions imposed by the alternate large and small cavities. In the presently disclosed device this contamination is used to advantage to provide output coupling to a circular guide operating in the $TE_{01}$ mode. This is a highly desirable manner of effecting energy transmission at the superpower levels inasmuch as the losses in more ordinary waveguides would necessitate the employment of complex cooling arrangements to avoid overheating and melting of the guide. Additionally, the decrease in transmission loss adapts the system for increased overall efficiency.

The output coupling to the mentioned low-loss $TE_{01}$ mode can be accomplished by a gradual and controlled conversion of all energy from the operating mode, which, as noted above, is a linear combination of the $$TE_{\frac{N}{2},1}$$

and $TE_{01}$ modes, to the $TE_{01}$ mode which, in effect, results in a gradual increase in the "zero-mode contamination."

Structurally, the above-discussed gradual increase in the "zero-mode contamination" can be accomplished by a device of the type illustrated in FIGURES 11–15, which device provides a smooth and continuous change in geometry in the direction of wave energy propagation.

The device of FIGURES 11–15 can be substantially identical in structure and function to that of FIGURE 1 up to the section where the envelope wall divergence commences. Specifically, the device of FIGURES 11–15 includes an envelope 50 having a pair of longitudinally spaced smaller and larger diameter cylindrical wall sections 51 and 52, respectively, interconnected by a frusto-conical wall section 53. The smaller diameter wall section 51 and the frusto-conical wall section 53 contain an anode structure comprising an anode block 54 formed to include alternate large and small cavities 55 and 56, respectively. The larger diameter section 52 of the envelope constitutes a circular guide adapted for low-loss $TE_{01}$ mode transmission.

In the smaller cylindrical wall section 51 of the envelope the anode cooperates with a coaxial cathode 10 to define both an elongated annular interaction space and a coaxial waveguide. The cathode 10 can be of the directly-heated type including an emissive cylindrical outer member 11 and a heating element 12. The cathode can be substantially identical in structure and function to that described above in connection with the previously described embodiments and, therefore, need not be described fully at this point. The same applies to the input coupling means 14 which can be identical to that bearing the same identifying numeral in FIGURE 1. A solenoid coil 13 provides a static magnetic field extending coaxial in the interaction space.

In the frusto-conical section 53 of the envelope, and as seen in FIGURES 11–15, the anode structure, or radial lengths of the anode segments gradually diminish in length in the direction of wave propagation and taper to zero radial length or are discontinued at the entrance to the larger cylindrical wall section 52 of the device. Additionally, in the frusto-conical section of the envelope a non-emissive extension on the cathode 11 is provided which is uniformly tapered to a point. The taper of the radial lengths of the anode segments and the taper of the non-emissive section of the cathode thus provide the above-discussed gradual transition from the rising-sun cross-sectional configuration of the anode structure to the circular cross section of the circular section waveguide which has the desirable effect of gradually increasing the zero-mode contamination to facilitate transition of the energy to the low-loss mode characteristic of the circular waveguide section.

The outer end of the circular wall section 52 can be fitted with a hermetically sealed dielectric R.F. window 57 and coupled to a circular waveguide section 58 adapted for transmitting power in the low loss $TE_{01}$ mode to a useful load.

Figure 11:
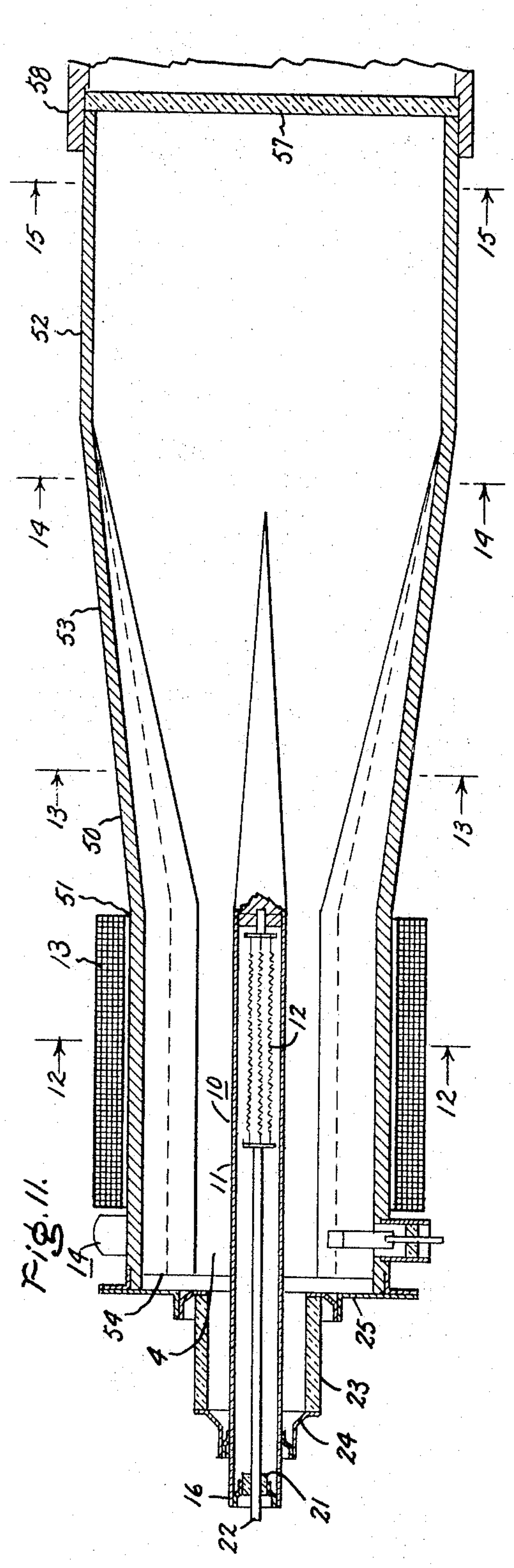
FIGURE 11 is still another modified form of the present invention.
Figure 15:
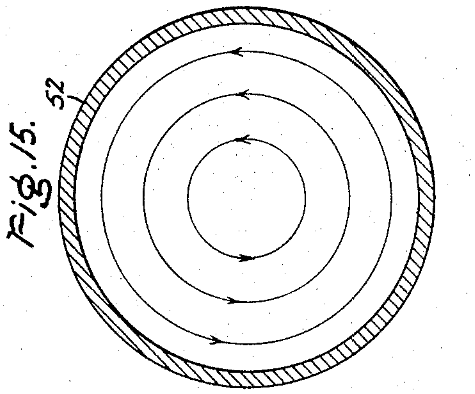
FIGURES 12 to 15 are sectional views taken along the indicated lines in FIGURE 11 and looking in the direction of the arrows.
Figure 14:
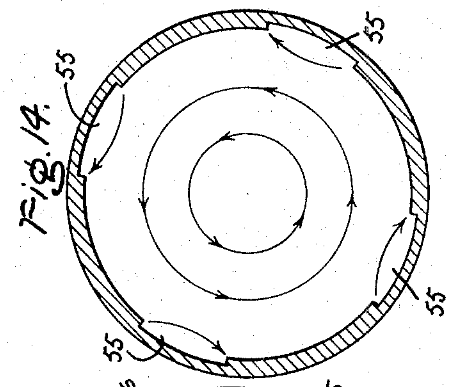
Figure 13:
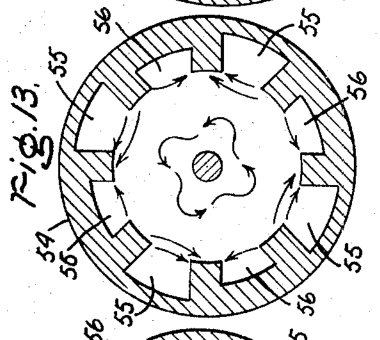
Figure 12:
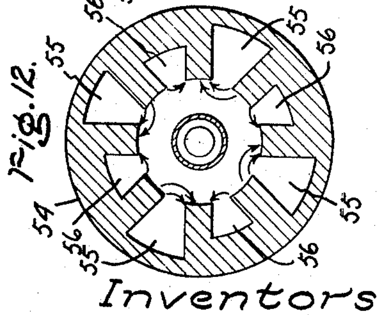

It is to be understood that while the device of FIGURE 11 has been illustrated as including an anode structure having a rising-sun cross section the invention of the just-described embodiment effective for coupling energy out of the device in the low loss $TE_{01}$ mode is equally applicable to devices having cavities and anode segments of uniform dimensions, as well as to inverted forms of the device wherein the anode and cathode positions are interchanged. Also, if desired, a solenoid of the type employed in the embodiment of FIGURE 6 can be employed in place of the solenoid 13 to provide for axial electron flow and the operational advantages obtainable therewith. Still further, if desired, the anode segments in the device of FIGURE 11 can be periodically segmented in the manner of the teaching of FIGURE 9 to provide for axial periodicity to increase gain per unit length of the device.

While there has been shown and described specific embodiments of the present invention it is not desired that the invention be limited to the particular forms shown and described, and it is intended by the appended claim to cover all modifications within the spirit and scope of the invention.

What is claimed as new and desired to be secured by Letters Patent of the United States is:

1. A transverse wave amplifier comprising, spaced cathode and anode means defining a transmission line having an interaction space therein, said transmission line adapted for supporting and propagating a fast electromagnetic wave having a slow wave electric field component extending transverse the direction of propagation of the fast wave, means including an axially directed magnetic field component for establishing an electron flow transverse the direction of propagation of said fast wave and parallel to the direction of said transverse electric field component thereof, input means for introducing an electromagnetic wave signal having a transverse electric field component at one section of said transmission line and output means for extracting amplified electromagnetic wave energy from another section of said transmission line longitudinally spaced a plurality of free-space wavelengths from said one section along the path of propagation of said fast wave, and means providing a progressively decreasing interaction impedance along said transmission line between said input and output means.

2. The invention as recited in claim 1 wherein energy dissipation means are positioned beyond said output means in said path of propagation to be effective for dissipating wave energy not extracted by said output means.

3. The invention as recited in claim 1 wherein frequency sensitive means are positioned beyond said output means in said path of propagation for selectively permitting only certain frequency wave energy to continue therepast.

4. The invention as recited in claim 3 wherein said dissipation means is low reflection termination means for dissipating said certain frequency wave energy.

5. The invention as recited in claim 1 wherein further magnetic means are included in said amplifier which in cooperation with said transverse electric field component are effective for providing a component of electron velocity in the direction of the path of propagation of said fast wave.

6. The invention as recited in claim 5 wherein said anode comprises a plurality of spaced parallel elongated segments, and said cathode includes contact means to provide a D.-C. current in said cathode and an electron velocity parallel to said anode segments.

7. The invention as recited in claim 5 wherein said anode comprises a plurality of spaced parallel elongated segments, and magnetic means are included to provide a tapered magnetic field in said interaction space to introduce said electron velocity extending parallel to said anode segments.

8. The invention as recited in claim 1 wherein anode means are provided in said transmission line along the path of propagation of said slow wave to provide periodic impedance to said slow wave.

9. A transverse wave amplifier comprising, a pair of spaced anode and cathode elements defining a magnetron interaction space therebetween, means for establishing an electric field across said interaction space, said anode element comprising a plurality of spaced parallel elongated anode segments defining a plurality of parallel elongated cavities, said anode and cathode elements constituting a transmission line effective for supporting and propagating an electromagnetic wave parallel to the direction of said anode segments and transverse said electric field, means for directing electrons transverse the direction of said anode segments and said electric field in said interaction space, input and output means located at longitudinally spaced sections of said transmission line, whereby an electromagnetic wave signal introduced at said input means into said magnetron interaction space is amplified by propagating along said line in the direction of said anode segments and is extractable at said output means, and at least alternate ones of said cavities being of progressively increased depth from said input means toward said output means.

10. The invention as recited in claim 9 wherein at least equally spaced ones of said anode segments are uniformly segmented to provide a periodic impedance in said transmission line along said path of propagation of said wave signal.

11. The invention as recited in claim 9 wherein said alternate ones of said cavities are smaller than the other cavities.

12. The invention as recited in claim 9 wherein said anode and cathode elements comprise a coaxially spaced inner emissive cathode element and an outer anode element to define an annular transmission line.

13. The invention as recited in claim 12 wherein contact means are provided for said cathode for D.-C. current flow therethrough to introduce a component of electron velocity in said interaction space extending parallel to the direction of said electromagnetic wave.

14. The invention as recited in claim 12 wherein magnetic field means are provided in said device to generate a magnetic field in said interaction space of progressively less concentration in the direction of said path of propagation of said wave signal.

15. The invention as recited in claim 12 wherein said alternate ones of said cavities are smaller than the others.

16. The invention as recited in claim 12 wherein frequency selective means are positioned at a section of said transmission line disposed beyond said output means to be effective for selectively permitting only certain frequency wave energy to continue therepast along said transmission line.

17. The invention as recited in claim 12 wherein said output means comprises a section of a circular waveguide coaxially coupled to the output end of said transmission line, said section defining a gradual transition in geometry from said cavity resonators to said circular waveguide.

18. A transverse wave amplifier according to claim 16 and further including a dielectric R.F. window hermetically sealed transversely in said circular waveguide section.

19. The invention as recited in claim 17 wherein alternate ones of said cavities are smaller than the other cavities.

20. A transverse wave amplifier according to claim 19, and further including a tapered non-emissive coaxial extension on said cathode assisting in effecting said gradual transition.

21. The invention as recited in claim 19 wherein both the anode segments and the depths of the cavity resonators are tapered to provide a gradual transition in geometry from said cavities to said wave guide.

22. A transverse wave amplifier comprising, a coaxial transmission line having spaced inner and outer conductors defining an interaction space, one of said conductors comprising an anode including a plurality of radially and longitudinally extending segments defining elongated cavities, alternate ones of said cavities being smaller than the others, the other of said conductors comprising a cathode including an emissive surface, means for establishing an axial magnetic field along said transmission line, means for establishing a radial electric field across said interaction space, input means for introducing an electromagnetic wave signal at one section of said transmission line for propagation therealong and resultant amplification, output means comprising a section of circular waveguide of greater diameter and coaxially coupled to said outer conductor of said transmission line, said anode segments, the depth of said cavity resonators and said outer conductor all being tapered toward the circular waveguide to provide a gradual transition in geometry from said cavities to said circular waveguide, said cathodes including a tapered non-emissive coaxial extension assisting in effecting said gradual transition, and a dielectric R.F. window hermetically sealed transversely in said circular waveguide section.

References Cited by the Examiner

UNITED STATES PATENTS

| | | | |
|---|---|---|---|
| 2,485,401 | 10/1949 | McArthur | 315—39.75 X |
| 2,590,612 | 3/1952 | Hansell | 315—39.75 X |
| 2,680,827 | 6/1954 | Randall et al. | 315—39 X |
| 2,761,091 | 8/1956 | Gutton et al. | 315—39.75 |
| 2,895,075 | 7/1959 | Millership | 315—39 |
| 2,942,142 | 6/1960 | Dench | 315—39.3 X |
| 2,953,714 | 9/1960 | Rostas | 315—39.75 X |
| 3,096,462 | 7/1963 | Feinstein | 315—39.53 |
| 3,148,302 | 9/1964 | Clavier et al. | 315—3 |

JAMES W. LAWRENCE, *Primary Examiner.*

ROBERT SEGAL, *Assistant Examiner.*